US010353220B2

(12) United States Patent
Thompson et al.

(10) Patent No.: US 10,353,220 B2
(45) Date of Patent: Jul. 16, 2019

(54) TEAR SHAPING FOR REFRACTIVE CORRECTION

(71) Applicant: Vance M. Thompson, Sioux Falls, SD (US)

(72) Inventors: Vance M. Thompson, Sioux Falls, SD (US); Amitava Gupta, Roanoke, VA (US)

(73) Assignee: Vance M. Thompson, Sioux Falls, SD (US)

( * ) Notice: Subject to any disclaimer, the term of this patent is extended or adjusted under 35 U.S.C. 154(b) by 135 days.

(21) Appl. No.: 15/295,013

(22) Filed: Oct. 17, 2016

(65) Prior Publication Data

US 2018/0107024 A1    Apr. 19, 2018

(51) Int. Cl.
 *G02C 7/00* (2006.01)
 *G02C 7/02* (2006.01)
 *G02C 7/04* (2006.01)

(52) U.S. Cl.
 CPC ............. *G02C 7/047* (2013.01); *G02C 7/049* (2013.01)

(58) Field of Classification Search
 CPC ........ G02C 7/021; G02C 7/022; G02C 7/024; G02C 7/041–049; G02C 7/04; G02C 7/104; A61F 2/14; A61F 2/142; A61F 2/145; A61F 2/147; A61F 2/164; A61F 2/1451; A61F 2/1453; A61F 2/1613; A61F 2/1618; A61F 9/00; A61F 9/007; A61F 9/0017; A61F 9/00804; A61F 9/04; B24B 13/0006; B24B 13/0025; G02B 1/043; B29D 11/00028; B29D 11/00038; B29D 11/00048
 USPC ............ 351/159.02, 159.04, 159.14, 159.22, 351/159.23, 159.33, 159.62, 159.73, 351/159.74, 159.78, 178, 15, 9.73
 See application file for complete search history.

(56) References Cited

U.S. PATENT DOCUMENTS

2006/0132707 A1\*  6/2006  Tung ..................... A61F 9/0017
                                                                351/159.23
2007/0242216 A1\* 10/2007  Dootjes ................... G02C 7/04
                                                                351/159.73

\* cited by examiner

*Primary Examiner* — Mustak Choudhury
(74) *Attorney, Agent, or Firm* — Patterson Thuente Pedersen, P.A.

(57) ABSTRACT

A lens for refractive tear shaping, including a curved lens body defining a central cavity indented into its posterior surface. The central cavity has a posterior facing tear shaping surface structured to form a tear lens within the central cavity. The central cavity is structured to define a tear lens within the central cavity by interaction between a tear film of the eye and the posterior facing tear shaping surface. The anterior curvature of the tear lens being dependent on the shape of the tear shaping surface.

18 Claims, 14 Drawing Sheets

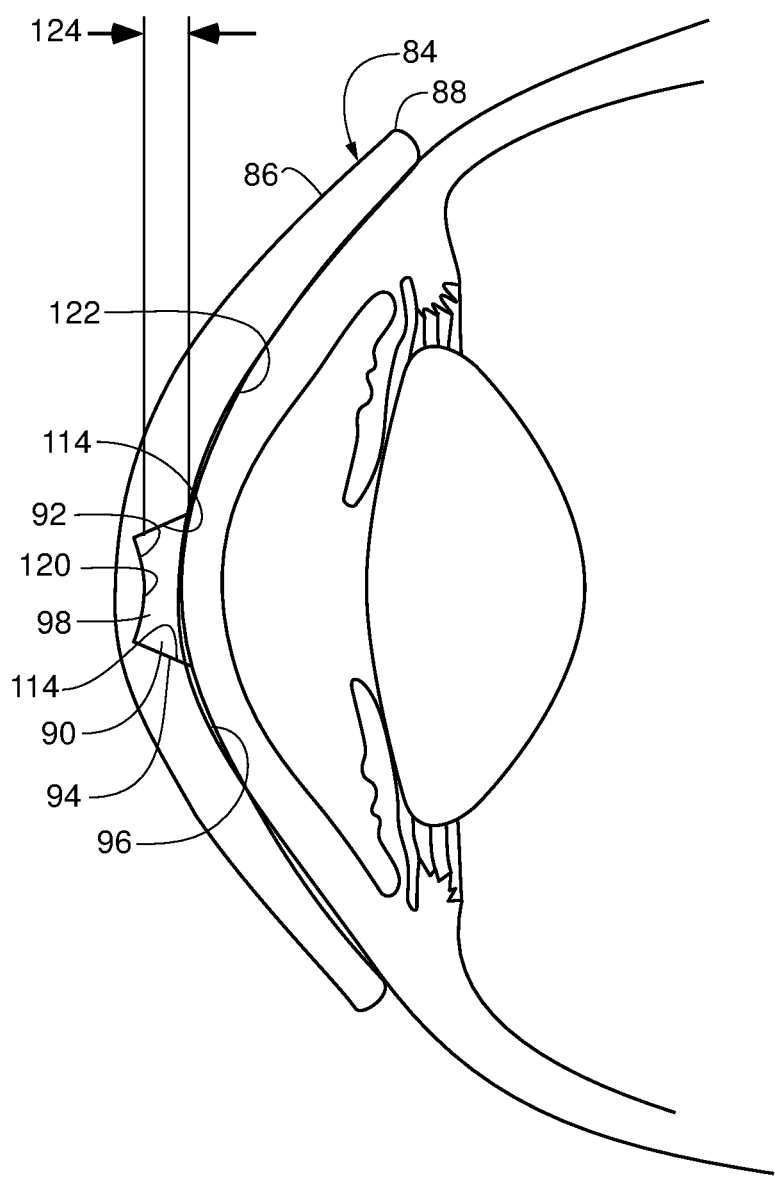

TEAR SHAPING FOR REFRACTIVE CORRECTION

TECHNICAL FIELD

The invention generally relates to contact lenses and refractive correction by applications of contact lenses or other structures to the eye.

BACKGROUND

Known contact lenses generally cover virtually the entire cornea or cover the cornea centrally while leaving a portion of the peripheral cornea uncovered. Contact lenses known to the Applicant achieve refractive correction because of the optical nature of an optically transparent, rigid, semi-rigid or flexible material that refracts light and thus alters the refraction of light striking the cornea and passing through the other optical parts of the eye to an image formed on the retina.

The concept of a tear lens is known to exist in the context of conventional contact lenses. The tear lens is formed by a layer of tears bounded on an anterior surface by the back of a contact lens optical zone and at a posterior surface of the tear lens by the surface of the corneal epithelium. A tear lens, as understood in this conventional sense, contributes to refractive correction primarily in the context of rigid contact lenses. This is because the posterior surface of the rigid contact lens maintains its shape and curvature independent of the shape of the cornea and affects the focusing of light in addition to the refractive power of the contact lens. While a tear lens technically exists in the context of flexible or soft contact lenses, the effect of the tear lens on refraction is negligible because of the general conformity of the soft contact lens shape to the shape of the cornea.

Numerous possible complications are known to exist with use of contact lenses on the cornea even though modern contact lenses cause fewer complications than contact lenses of decades ago. The presence of contact lenses can lead to stasis and entrapment of the tear film which can lead to an accumulation of corneal epithelial waste products in the entrapped tear film. Corneal epithelial waste products in high enough concentrations can be toxic to the cells of the corneal epithelium. Mechanical interaction between the posterior surface of the contact lens and the corneal epithelium can lead to abrasion or distortion. Entrapment of solid objects, however tiny between the posterior surface of the contact lens and the anterior corneal epithelium can also lead to corneal epithelial abrasion. Under some circumstances, the reduction of oxygen available to the corneal epithelium by having the barrier of the contact lens between the corneal epithelium and the atmosphere can lead to health complications for the corneal epithelium as well.

There is still room for improvement in the arts of refractive correction by application of lenses to the eye.

SUMMARY

The invention solves many of the above stated problems by providing a lens having a central opening or central cavity which centers on the optical axis of the eye. The central opening is structured such that capillary action forms a meniscus of tears in the opening. According to an example embodiment of the invention, the inventive lens is structured so that a concave meniscus is formed. The concave meniscus is provided for correction of myopia. It is expected that a concave meniscus will form in a relatively larger diameter opening according to embodiments of the invention.

According to an example embodiment of the invention, the diameter of the central opening or central cavity falls in a range from 1.0 to 5.0 millimeters. According to another example embodiment the diameter of the central opening falls in a range from 2.0 to 3.0 millimeters and in another example embodiment 2.5 to 2.8 millimeters. A further example embodiment presents a central opening of 2.8 to 3.5 millimeters.

According to another example embodiment of the application, a convex meniscus is formed. A convex meniscus is expected to form in a case of a smaller diameter opening in the lens which generally overlies the optical axis of the eye.

Formation of the tear meniscus is affected by a number of factors including: tear production, rate of evaporation; temperature, posture of the lens user. These factors can be considered in design of the lens according to the invention.

In the case of a central cavity, the anterior surface of the cavity located on the posterior surface of the lens borders and determines the shape of the tear film posterior to the lens and between the posterior lens and the anterior cornea. The tears thus form a lens component that has a refractive effect in addition to the refractive effect of the contact lens.

According to another example embodiment of the invention, the opening is non-circular in structure. For example, an oval opening is expected to create a meniscus having a first curvature in a first axis and a second curvature in a second axis and thereby permitting correction of astigmatism by the tear meniscus formed. According to example embodiments of the invention, the central opening may be oval in shape or polygonal having a first axis longer than a second axis to achieve the astigmatic correction.

According to example embodiments of the invention, the cross-sectional shape of the edge or periphery of the opening may vary when viewed in cross-section.

According to an example embodiment, the cross-sectional shape of the periphery of the opening may demonstrate a thick rim. According to another example embodiment, the cross-sectional shape of the periphery of the opening may demonstrate the thin rim.

According to another embodiment, the cross-sectional shape of the periphery of the opening may demonstrate a straight rim. The straight rim may be substantially radial in orientation as compared to the curvature of the lens and opening or may be tilted to create an acute or obtuse angle relative to a tangent to the corneal surface.

According to another example embodiment of the invention, the periphery of the opening may demonstrate a concave shape when viewed in cross section.

According to another example embodiment of the invention, the periphery of the opening may demonstrate a convex shape when viewed in cross section.

According to another example embodiment of the invention, the cross-sectional shape of the periphery of the opening may demonstrate a polygonal cross-section which may be either concave or convex.

According to other example embodiments of the invention, the cross-sectional shape of the rim may vary around the circumference of the periphery of the opening. For example, a portion or portions of the periphery of the opening when viewed in cross-section may be concave while other portions may be convex.

According to another example embodiment of the invention, the perimeter of the rim may vary in shape when viewed in an anterior-posterior direction.

According to another example embodiment of the invention, the perimeter of the rim viewed anterior to posterior may have a smooth continuous curved shape.

According to another example embodiment of the invention, the perimeter of the rim when viewed anterior to posterior may include indentations in the rim perimeter.

According to another example embodiment of the invention, the rim perimeter may include appendages extending inwardly from the rim.

According to another example embodiment of the invention, the periphery of the opening when viewed in an anterior to posterior direction may have a circular shape. According to another example embodiment of the invention, the periphery of the opening when viewed in an anterior to posterior direction may have an oval shape and according to another example embodiment of the invention, the periphery of the opening in viewed in an anterior to posterior direction may have a polygonal shape. The polygonal shape may include a regular polygon or an irregular polygon shape. The polygon may be generally radially symmetrical or may be other than radially symmetrical.

According to another example embodiment of the invention, a contact lens includes a centrally located partial depth opening or cavity located centrally on the posterior concave surface of the lens. For example, the cavity may have a diameter of 2 mm to 5 mm at the center of the posterior surface of the lens. According to an example embodiment of the invention, the center or the centroid of the partial depth cavity is collinear with the optical center of the lens and when placed on an eye is substantially aligned with the optical axis of the eye. The partial depth cavity is bounded by an anterior surface which coincides with the posterior surface of the lens within the cavity. In situ, the cavity is also bounded by the anterior surface of the cornea. The anterior to posterior depth of the cavity according to an example embodiment is not less than 25 microns and not more than 100 microns as measured from a center of the tear shaping surface and to an imaginary extension of a base curve of the curved lens body. In this embodiment the base curve of the lens is considered to be the posterior curve immediately surrounding the partial depth cavity.

According to example embodiments of the invention, the shaped posterior surface of the lens within the cavity may have a radius of curvature that is more or less than the radius of curvature of the anterior cornea in the region of the cornea where the cavity is located when the lens is on an eye. According to known optics, a shaped posterior surface of the lens having a radius of curvature greater than the radius of curvature of the anterior corneal surface will generally provide a space in which a negative powered tear lens is formed. Conversely, a shaped posterior surface lens bounding the cavity having a radius of curvature less than the radius of curvature of the corneal region that bounds the rear of the cavity will generally lead to a tear lens having positive optical power.

According to another example embodiment of the invention, the lens body may define one or more passages having a diameter of no more than about 2 microns and no less than about 0.5 microns. These passages extend from the posterior lens to the anterior lens surface through the body of the contact lens. The openings are expected to promote tear exchange and oxygen exchange between tears under the lens and tears anterior to the lens.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 20 is a cross-sectional view of another contact lens according to an embodiment of the invention in situ on an eye.

Figure 1:
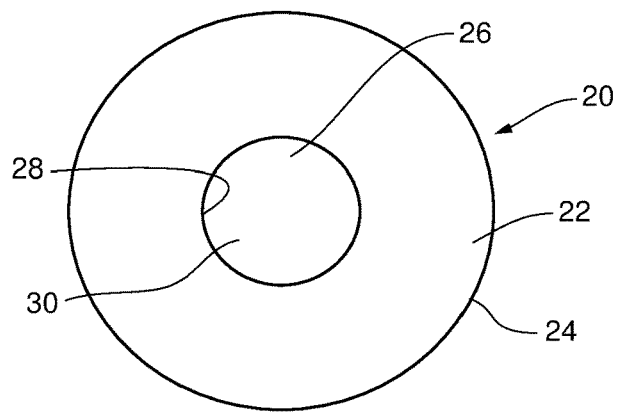
FIG. 1 is an anterior to posterior view of a lens for refractive tear shaping having a circular central opening therein.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

Referring to FIGS. 1-13, embodiments of the invention are directed to lens for refractive tear shaping 20 wherein refractive correction is achieved or enhanced by the shaping of the tear film.

Referring particularly to FIGS. 1-6, lens for refractive tear shaping 20 according to an example embodiment of the invention generally includes lens body 22 having peripheral edge 24 and defining central opening 26. Central opening 26 is surrounded by a tear shaping edge 28. According to the depicted embodiment, tear shaping edge 28 defines circular central opening 30. Tear shaping edge 28 can have a number of cross sectional structures and shapes as described below.

Figure 2:
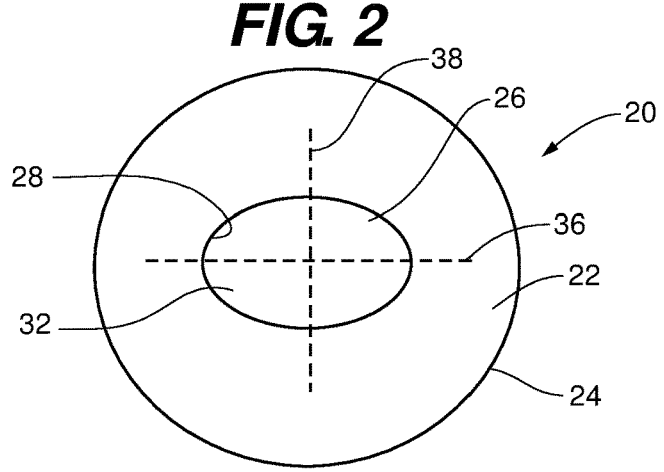
FIG. 2 is an anterior to posterior view of a lens for refractive tear shaping having an oval central opening therein.

Referring now to FIG. 2, another embodiment of lens for refractive tear shaping 20 is depicted. The depicted embodiment includes lens body 22 having peripheral edge 24 and elliptical or oval central opening 32. Elliptical or oval central opening 32 is bounded by tear shaping edge 28.

Figure 3:
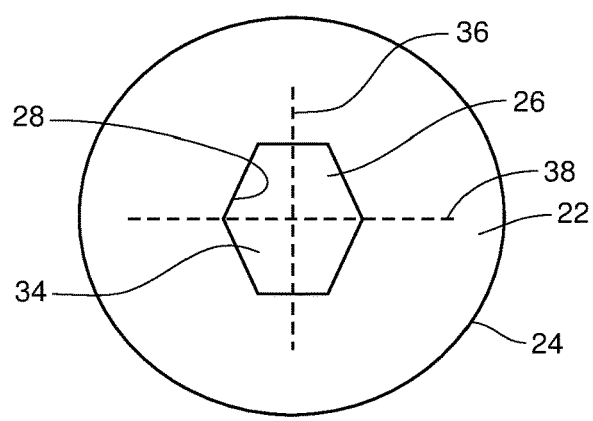
FIG. 3 is a lens for refractive tear shaping having a polygonal opening therein.

Referring to FIG. 3, another embodiment of lens for refractive tear shaping 20 is depicted having polygonal central opening 34. Polygonal central opening 34 is depicted as an irregular hexagon, however polygonal central opening 34 may have more or less than six sides and six vertices.

Referring particularly to FIGS. 2 and 3, elliptical or oval central opening 32 and polygonal central opening 34 may have long axis 36 and short axis 38.

Figure 4:
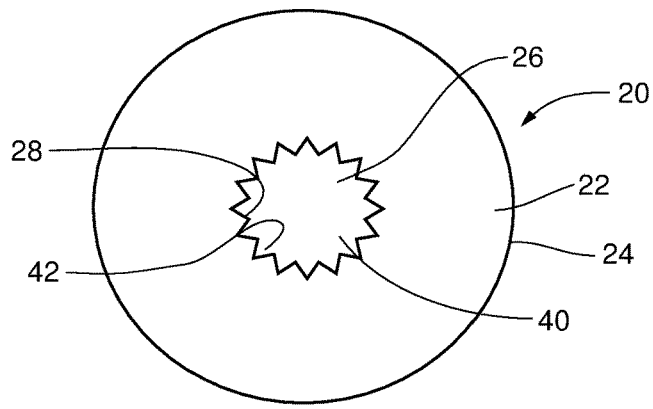
FIG. 4 is an anterior to posterior view of a lens for refractive tear shaping having a stellate opening with indentations according to an example embodiment of the invention.

Referring now to FIG. 4, according to another embodiment, lens for refractive tear shaping 20 defines stellate opening 40 having indentations into the material of the lens surrounding stellate opening 40. While stellate opening 40 is depicted as circularly symmetrical, stellate opening 40 may also have long axis 36 and short axis 38.

Figure 5:
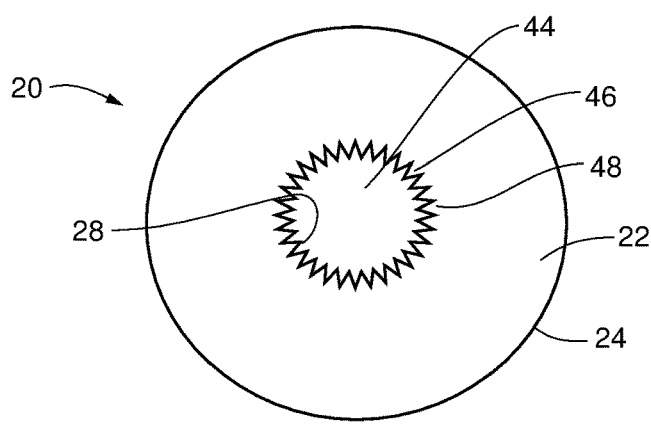
FIG. 5 is an anterior to posterior view of a lens for refractive tear shaping having a stellate opening with appendages according to an example embodiment of the invention.

Referring now to FIG. 5, another embodiment of lens for refractive tear shaping 20 is depicted. According to the depicted embodiment, stellate opening with appendages 44 is depicted. Appendages 46 extend inwardly from outer edge 48. While depicted as circularly symmetrical, stellate opening with appendages 44 may also have long axis 36 and short axis 38.

Figure 6:
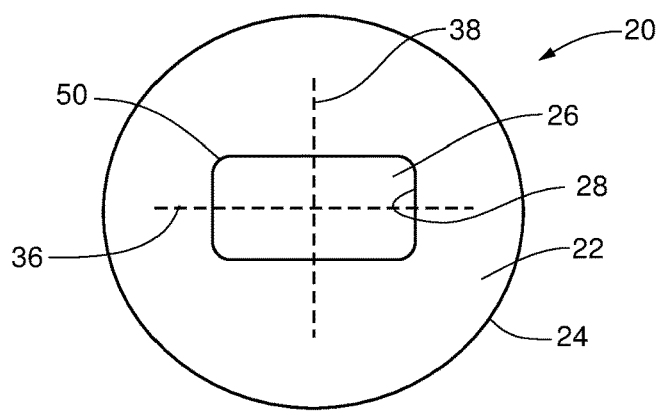
FIG. 6 is an anterior to posterior view of a lens for refractive tear shaping having a generally rectangular polygonal opening therein according to an example embodiment of the invention.

Referring now to FIG. 6, lens for refractive tear shaping 20 with rectangular opening 50 is depicted. Rectangular opening 50 is depicted having a particular proportional aspect ratio, however this should not be considered limiting as the aspect ratio of rectangular opening 50 may be altered by altering the length of long axis 36 as compared to short axis 38.

Referring now to FIGS. 7-13, cross-sectional views of example embodiments of lens for refractive tear shaping 20 are depicted.

Figure 7:
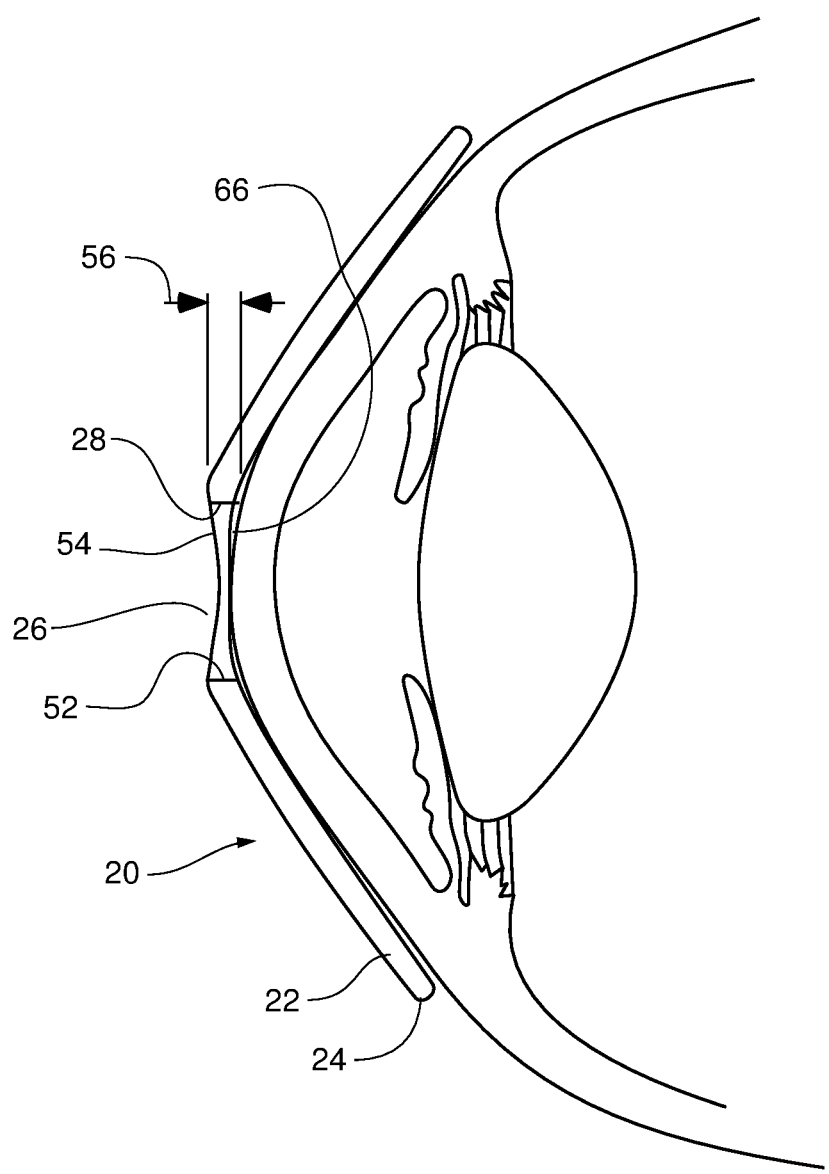
FIG. 7 is a cross-sectional view of a lens for refractive tear shaping in situ on a cornea and with a concave tear meniscus according to any example embodiment of the invention.

Referring particularly to FIG. 7, an embodiment of the invention including parallel tear shaping edge 52 is depicted. It is noted that lens body 22 in the embodiment depicted in FIG. 7 that parallel tear shaping edge 52 is generally parallel on opposing sides of central opening 26. Also depicted in FIG. 7 is concave tear meniscus 54. Concave tear meniscus 54 affects a negative refractive power due to its concave shape and is expected to contribute focusing power for correction of myopia. It is expected that the concavity of concave tear meniscus 54 will vary with the size of central opening 26 and with the depth 56 of tear shaping edge 28.

It is expected that to a certain point smaller diameter of central opening 26 will create a more steeply curved concave tear meniscus imparting greater negative refractive power and stronger correction for myopia. It is also expected that increasing depth 56 of tear shaping edge 28 will increase negative refractive power to a certain degree. As discussed above, central opening 26 may have various shapes, some of which include a long axis 36 and short axis 38.

It is expected that by judicious selection of the size of long axis 36 and short axis 38 that astigmatism may be corrected by creating a concave tear meniscus 54 having different shape and therefore differing power on various meridians.

Figure 8:
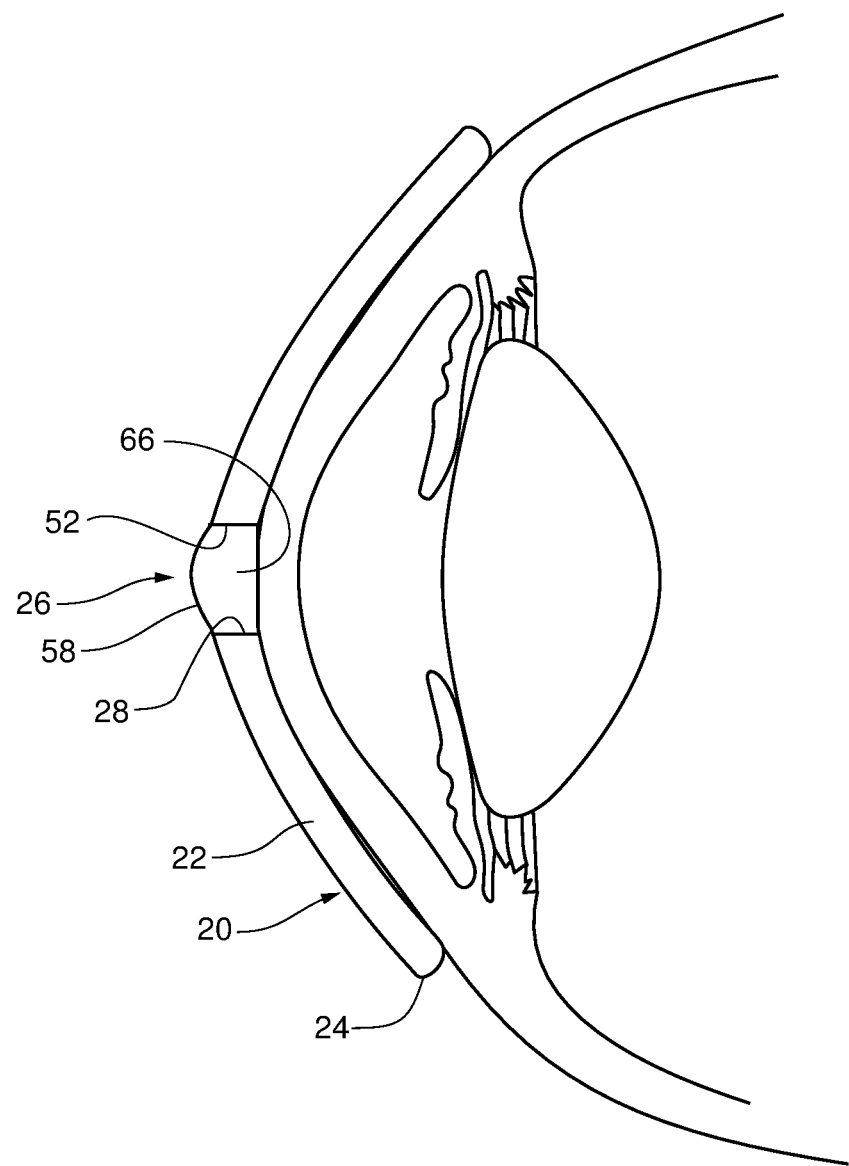
FIG. 8 is a cross-sectional view of a lens for refractive tear shaping in situ on a cornea with a convex tear meniscus according to an example embodiment of the invention.

Referring now to FIG. 8, lens for refractive tear shaping 20 having parallel tear shaping edge 52 is sized and configured to create convex tear meniscus 58. It is expected that when the size of central opening 26 is reduced to a sufficient degree, convex tear meniscus 58 will be formed in central opening 26. FIG. 8 depicts parallel tear shaping edge 52 along with a smaller diameter central opening 26 than does FIG. 7. It is expected that when the size of central opening 26 and depth 56 of tear shaping edge are appropriate convex tear meniscus 58 will be formed.

Figure 9:
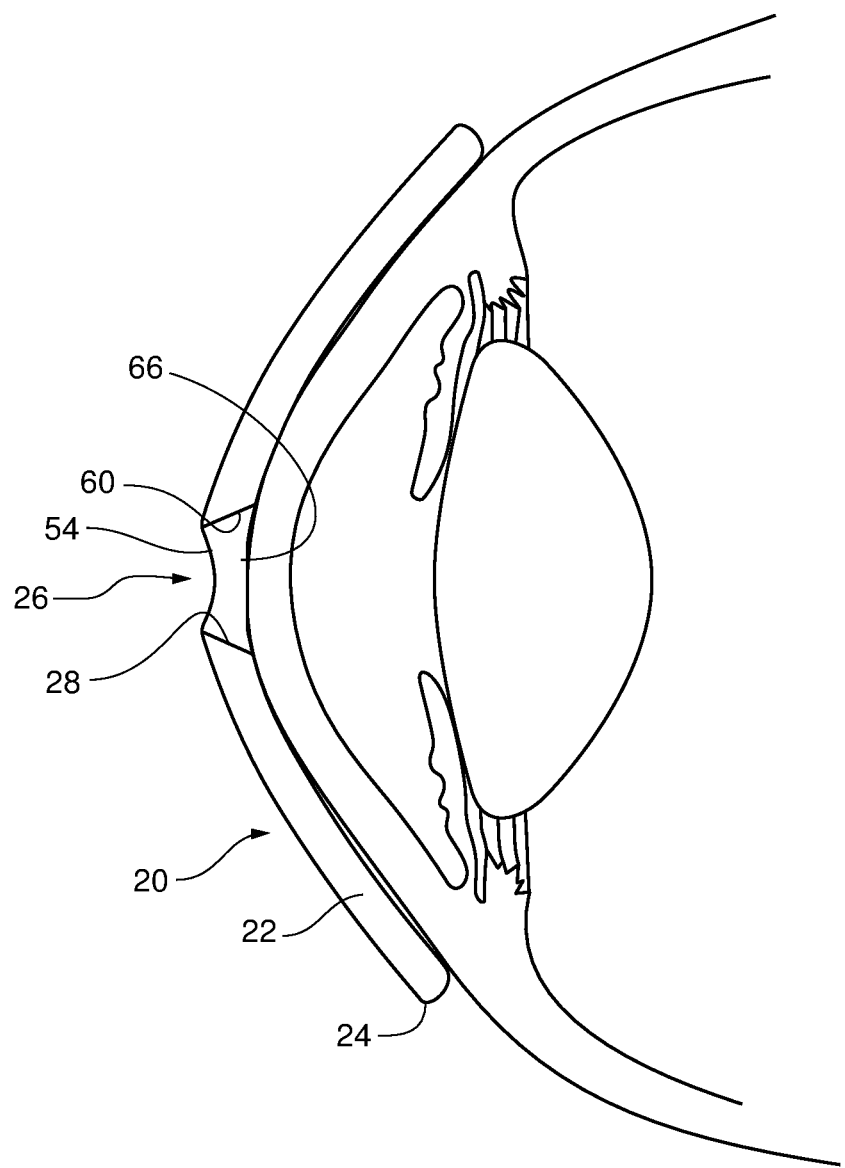
FIG. 9 is a cross-sectional view of a lens for refractive tear shaping in situ on a cornea with a central opening having inward angled edges and a concave tear meniscus according to an example embodiment of the invention.

Referring now to FIG. 9, lens for refractive tear shaping 20 with anterior acute tear shaping edge 60 is depicted. It is noted that anterior acute tear shaping edge 60 is arranged so that tear shaping edge 28 narrows from posteriorly-to-anteriorly. Concave tear meniscus 54 is also depicted. It is expected that anterior acute tear shaping edge 60 will create a more concave tear meniscus 54 thus, creating greater negative refractive power to concave tear meniscus 54.

Figure 10:
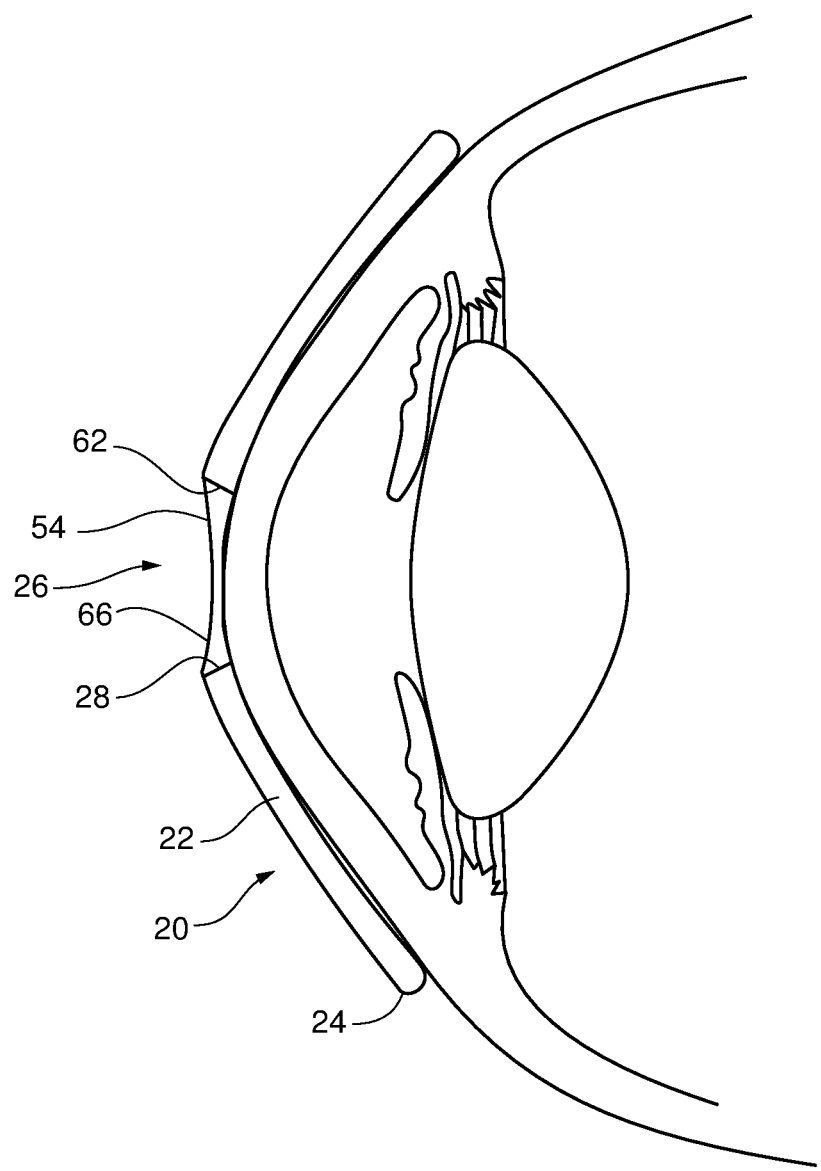
FIG. 10 is a cross-sectional view of a lens for refractive tear shaping in situ on a cornea with a concave tear meniscus and outwardly angled edges according to an example embodiment of the invention.

Referring now to FIG. 10, lens for refractive tear shaping 20 having anterior obtuse tear shaping edge 62 is depicted. Anterior obtuse tear shaping edge 62 is structured so that central opening 26 is wider anteriorly and narrower posteriorly. It is expected that anterior obtuse tear shaping edge 62 will create a flatter concave tear meniscus 54 as depicted in FIG. 10 thus, creating a concave tear meniscus having less negative refractive power than parallel tear shaping edge 52 having a similar posterior diameter.

Figure 11:
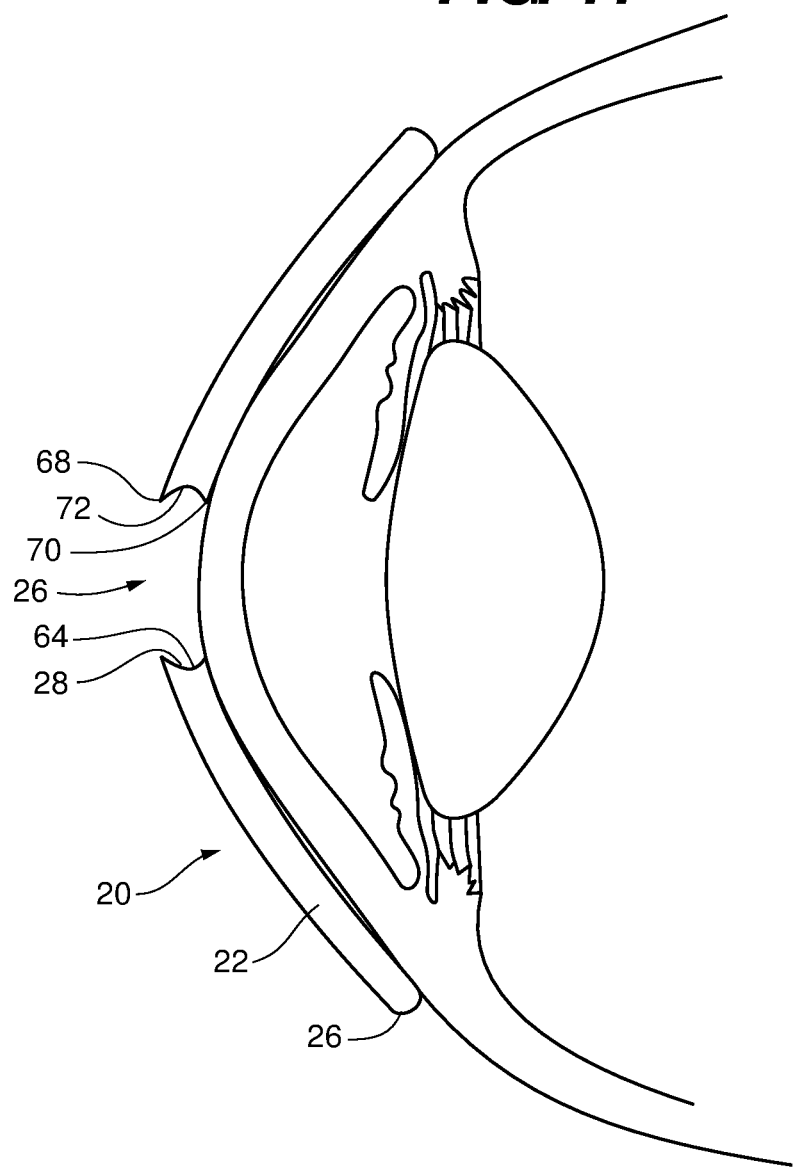
FIG. 11 is a cross-sectional view of a lens for refractive tear shaping having an opening with concave peripheral edges according to an example embodiment of the invention with the tear meniscus not depicted.

Referring now to FIG. 11, lens for refractive tear shaping 20 having concave tear shaping edge 64 is depicted. In FIG. 11, no tear meniscus 66 is depicted for clarity. Concave tear shaping edge 64 includes anterior edge 68, posterior edge 70 and concave portion 72.

Figure 12:
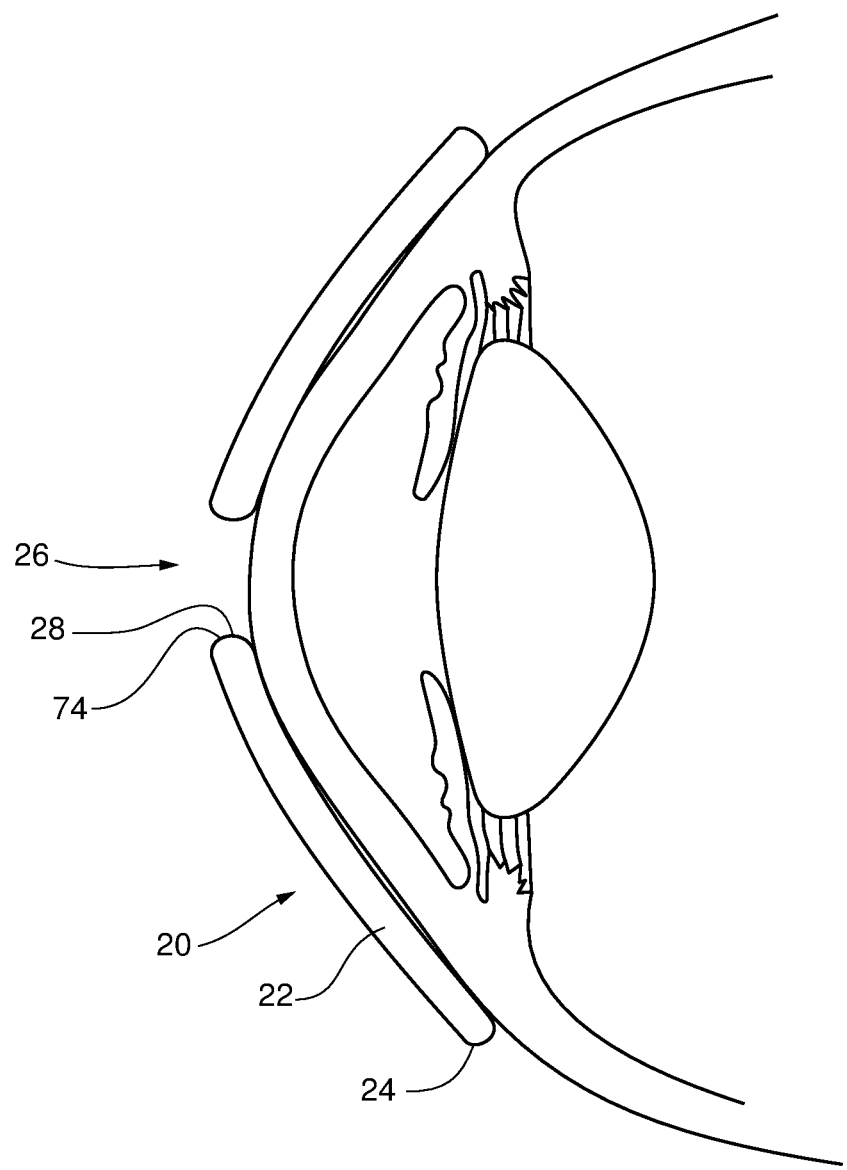
FIG. 12 is a cross-sectional view of a lens for refractive tear shaping having an opening with convex peripheral edges in situ on a cornea according to an example embodiment of the invention with the tear meniscus not depicted.

Referring now to FIG. 12, lens for refractive tear shaping 20 with convex tear shaping edge 74 is depicted. No tear meniscus 66 is depicted for clarity. In the depicted embodiment, convex tear shaping edge 74 has a radius of curvature approximately equal to half of depth 56 of tear shaping edge 20. This should not be considered limiting however as the radius of curvature of convex tear shaping edge 74 may vary.

Figure 13:
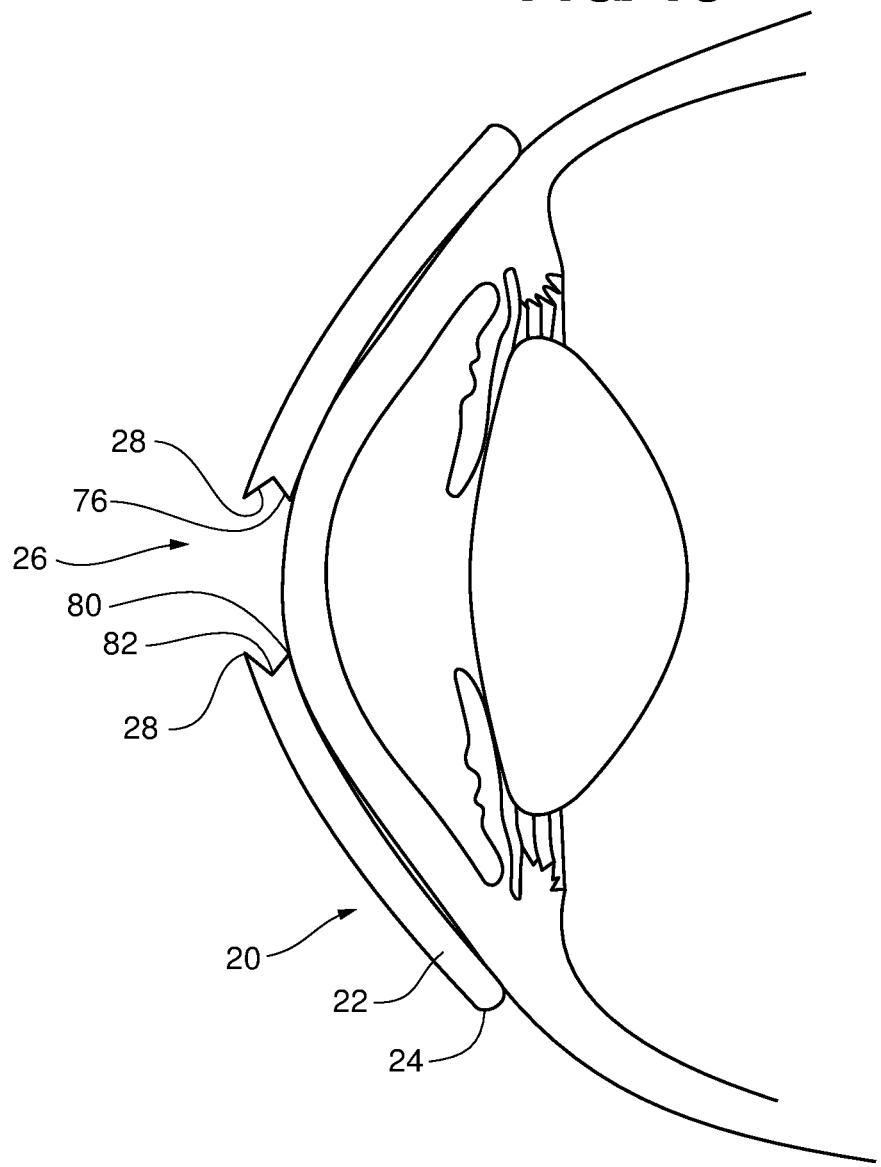
FIG. 13 is a lens for refractive tear shaping in situ on a cornea with an opening having polygonal peripheral edges with the tear meniscus not depicted.

Referring now to FIG. 13, lens for refractive tear shaping 20 with faceted tear shaping edge 76 is depicted. Faceted tear shaping edge 76 presents anterior edge 78, posterior edge 80 and internal angle portion 82.

Lens for refractive tear shaping 20 according to the various embodiments described herein may be formed from hydrogel polymers of the types used in soft contact lens that are now available or any hydrogel polymer materials to be developed in the future. Hydrogel polymers are generally water absorbent and hydrogel polymers may be used to manufacture lenses for refractive tear shaping 20 according to the invention by methods including but not limited to lathe cutting, cast molding, spin casting and injection molding. Lenses for refractive tear shaping 20 may also be manufactured from rigid oxygen permeable materials by known manufacturing processes including lathe cutting. It is to be understood that lens for refractive tear shaping 20 may be manufactured by any known contact lens manufacturing process or contact lens manufacturing processes to be developed in the future.

Lenses for refractive tear shaping 20 are expected to be made in diameters ranging from approximately 5 mm to 16 mm. Certain features of lens for refractive tear shaping 20 such as the diameter of central opening 26, the structure of tear shaping edge 28, the appropriate length of long axis 36 and short axis 38 to achieve desired refractive correction are expected to be developed with a certain degree of experimentation. It is expected that this degree of experimentation will not be undue and that those of ordinary skill in the art based on the present application disclosure will be able to engage in such experimentation without significant difficulty.

It is expected that for formation of concave tear meniscus 54, that smaller diameter central openings 26 will result in higher refractive power of concave tear meniscus 54, thus permitting higher degrees of refractive correction for myopia. It is also expected that when the diameter of central opening 26 becomes sufficiently small, tear meniscus 66 will transition from concave tear meniscus 54 to convex tear meniscus 58. Determination of this transition diameter for transition is expected to be achievable by reasonable levels of experimentation.

The effect of depth 56 of tear shaping edge 28 on refractive power of tear meniscus 66 also should be determinable by reasonable experimentation. It is expected that greater depth 56 will generally create a thicker periphery of tear meniscus 66 resulting in higher degrees to concavity of concave tear meniscus 54 and greater myopic correction.

Further, understanding of the effect of other features of the disclosed lenses including anterior acute tear shaping edge 60, anterior obtuse tear shaping edge 62, concave tear shaping edge 64, convex tear shaping edge 74 and faceted tear shaping edge 76 are expected to be achieved by reasonable experimentation well within the ability of one of ordinary skill in the art. It is expected that such experimentation will not be undue. It is also expected that the effect of stellate opening 40 with indentations 42 as well as stellate opening with appendages 44 and appendages 46 can also be determined experimentally.

Referring now to FIGS. 15-20, according to another embodiment of the invention, lens with partial depth cavity 84 is depicted in various embodiments.

Figure 14:
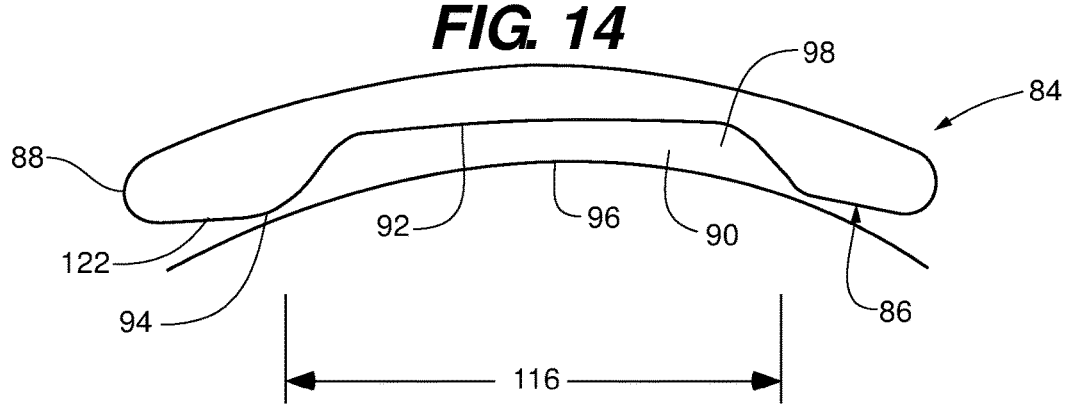
FIG. 14 is a cross-sectional view of a contact lens having a partial depth cavity with an anterior boundary flatter in curvature than the cornea in situ on a cornea according to an example embodiment of the invention.

Referring to FIG. 14, in the depicted embodiment, lens with partial depth cavity 84 generally includes lens body 86 presenting peripheral edge 88, central partial depth cavity 90, tear shaping surface 92, and cavity peripheral edge 94. Lens with partial depth cavity 84 is depicted as resting adjacent corneal surface 96. FIG. 14 depicts lens with partial depth cavity 84 having tear shaping surface 92 that is flatter in curvature than corneal surface 96, thus having a longer radius of curvature than corneal surface 96. Accordingly, in the depicted embodiment, tears underlying lens with partial depth cavity 84 generally provide a negative refractive power in addition to that provided by lens with partial depth cavity 84 alone due to tear lens 98.

Figure 15:
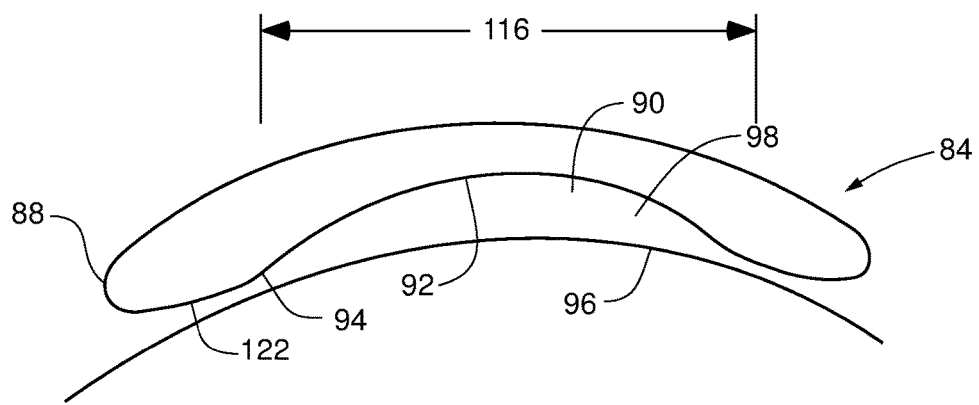
FIG. 15 is a cross-sectional view of a partial depth cavity contact lens having a curvature steeper than the anterior cornea.

Another example embodiment of lens with partial depth cavity 84 is depicted in FIG. 15. Structures labeled in FIG. 15 are similar to those labeled in FIG. 14 but tear shaping surface 92 of lens with partial depth cavity 84 depicted in FIG. 15 is curved more steeply than corneal surface 96 thus having a radius of curvature less than corneal surface 96 resulting in a positive powered tear lens 98.

Figure 16:
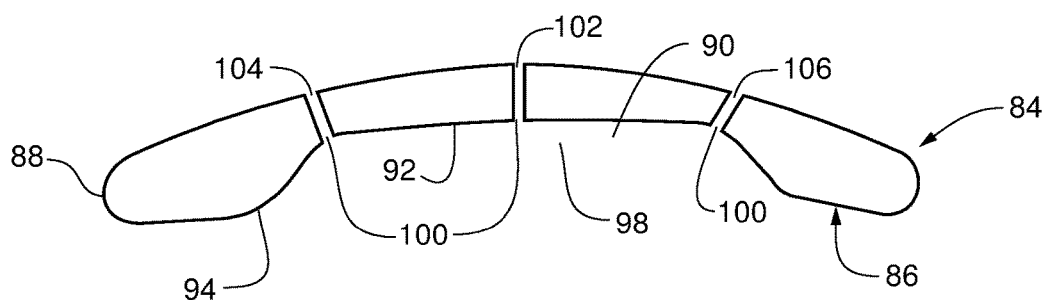
FIG. 16 is a cross-sectional view of a contact lens having a partial depth cavity flatter in curvature than the cornea, the lens body being pierced by a series of holes.
Figure 17:
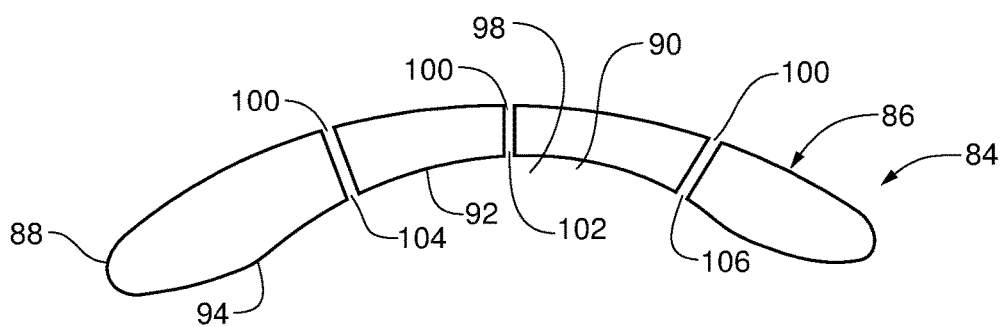
FIG. 17 is a cross-sectional view of a contact lens with a partial depth cavity having a steeper curvature than the cornea, the lens body pierced by a series of holes.

Referring now to FIGS. 16 and 17, according to the depicted embodiment, lens with partial depth cavity 84 includes at least one hole or passage 100 through lens body 86 as depicted. In the depicted embodiments, lens with partial depth cavity 84 presents central passage 102, first peripheral passage 104 and second peripheral passage 106. Any number of central passages 102 and peripheral passages 104 and 106 can be defined by lens body 86.

Figure 18:
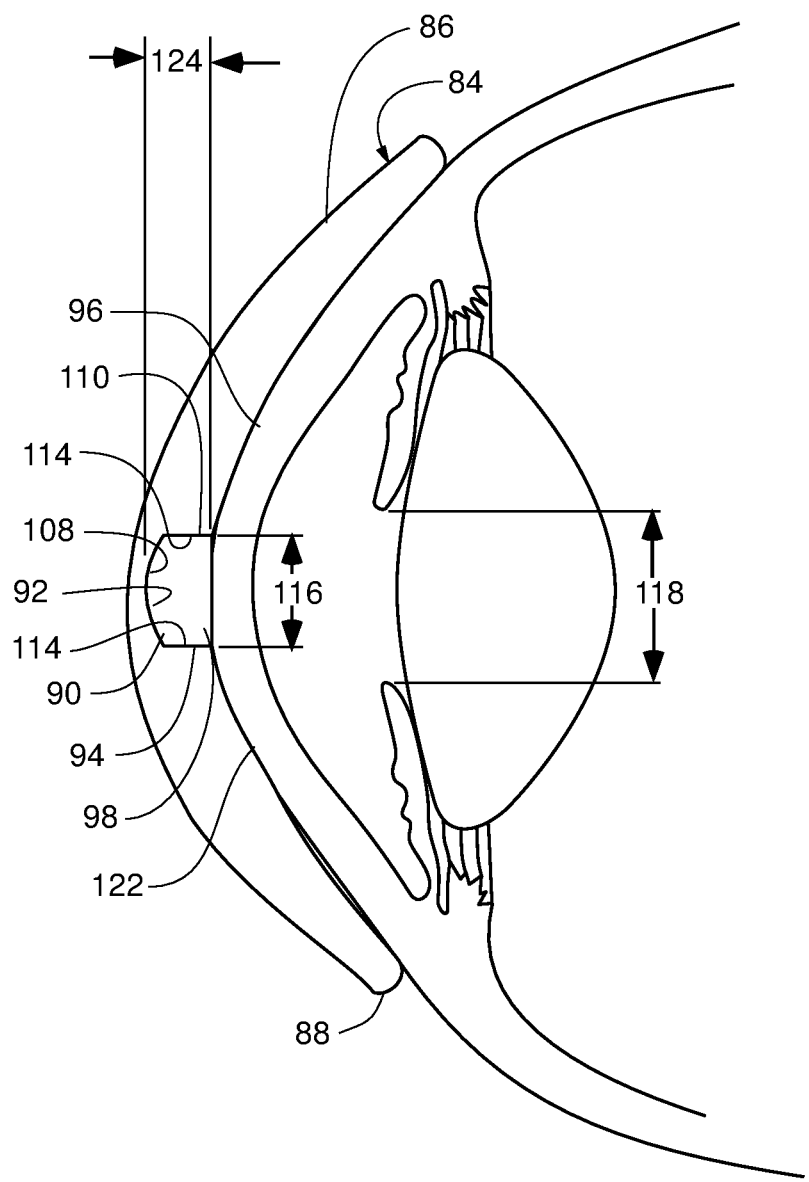
FIG. 18 is a cross-sectional view of a contact lens according to another example embodiment of the invention in situ on an eye.

Referring to FIG. 18, another embodiment of lens with partial depth cavity 84 is depicted. In the depicted embodiment, tear shaping surface 92 presents small diameter, concave tear shaping surface 108. In the depicted embodiment, cavity peripheral edge 94 includes generally parallel sides 110. For the purposes of this application, generally parallel sides 110 are considered to be generally parallel when they are within five degrees of parallel with each other.

Figure 19:
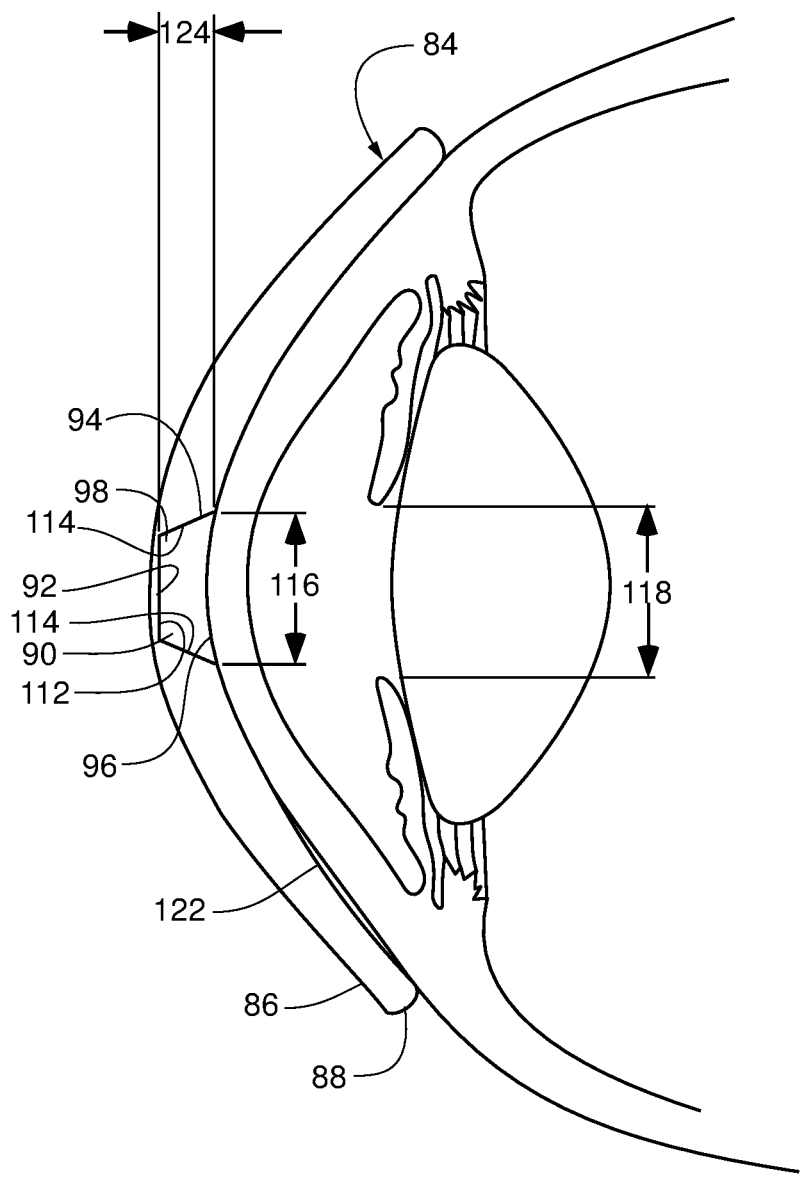
FIG. 19 is a cross-sectional view of a contact lens according to another example embodiment of the invention in situ on the eye.

Referring now to FIG. 19, another embodiment of lens with partial depth cavity 84 is depicted. In the depicted embodiment, central, partial depth cavity 94 is bounded by tear shaping surface 92 presenting concave to plano tear shaping surface 112. In the depicted embodiment, concave to plano tear shaping surface 112 is flatter in curvature and thus has a longer radius of curvature than corneal surface 96. In the depicted embodiment, cavity peripheral edge 94 presents non-parallel sides 114. Non-parallel sides 114 are considered to be non-parallel when the angle between non-parallel sides 114 is greater than five degrees relative to each other. In the depicted embodiment, central, partial depth cavity 94 has a cavity diameter 116 less than that of the pupil 118.

Referring now to FIG. 20, in the depicted embodiment, central, partial depth cavity 90 presents convex tear shaping surface 120 and non-parallel sides 114. Convex tear shaping surface 120 is not only flatter than corneal surface 96 but it is shaped so that an anterior surface of tear lens 98 is by concave, thus providing a stronger negative power to tear lens 98.

According to another example embodiment, lens 86 further presents base curve 122. Contrary to prior art base curve 121 is not the most central curve of lens body 86. The most central curve here is that of tear shaping surface 92. According to an example embodiment, base curve 122 is the curve of the posterior lens that immediately surrounds central partial depth cavity 90. Depth 124 of central partial depth cavity 90 is measured from an imaginary extension of based curve 122 across central partial depth cavity 90 to a center of tear shaping surface 92.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

The invention claimed is:

1. A lens for refractive tear shaping, comprising: a curved lens body having a peripheral edge and defining a central cavity indented into a posterior surface thereof, the posterior surface defining a base curve of the curved lens body and a central cavity presenting a recess relative to the base curve; the central cavity being shaped and sized and having a posterior facing tear shaping surface structured to form a tear lens within the central cavity; and the central cavity being structured to define a tear lens within the central cavity indented into the posterior surface by interaction between a tear film of an eye and the posterior facing tear shaping surface, the anterior curvature of the tear lens being dependent on the shape of the tear shaping surface; the central cavity having a cavity peripheral edge having a diameter of between two millimeters and five millimeters; a center or centroid of the cavity being located collinear with an optical center of the curved lens body; and the central cavity having a depth between twenty five microns and one hundred microns as measured from a center of the tear shaping surface and to an imaginary extension of the base curve of the curved lens body.

2. The lens for refractive tear shaping as claimed in claim 1, wherein the curved lens body further defines at least one passage therethrough that creates a fluid connection between the central cavity and an anterior surface of the lens.

3. The lens for refractive tear shaping as claimed in claim 2, wherein the at least one passage comprises a central passage.

4. The lens for refractive tear shaping as claimed in claim 2, wherein the at least one passage comprises at least one peripheral passage.

5. The lens for refractive tear shaping as claimed in claim 2, wherein the at least one passage comprises at least one central passage and at least one peripheral passage.

6. The lens for refractive tear shaping as claimed in claim 1, wherein opposing portions of the cavity peripheral edge, when viewed in cross section, are parallel.

7. The lens for refractive tear shaping as claimed in claim 1, wherein opposing portions of the cavity peripheral edge, when viewed in cross section, are non-parallel.

8. The lens for refractive tear shaping as claimed in claim 1, wherein the posterior facing tear shaping surface has a first radius of curvature longer than a second radius of curvature of an anterior corneal surface in which the lens is to be placed in close approximation.

9. The lens for refractive tear shaping as claimed in claim 1, wherein the posterior facing tear shaping surface has a first radius of curvature shorter than a second radius of curvature of an anterior corneal surface in which the lens is to be placed in close approximation.

10. A method of correcting refractive error, comprising: shaping a tear lens by applying a curved lens body having a central cavity indented into a posterior surface thereof to an eye so that the central cavity faces the eye, the posterior surface defining a base curve of the curved lens body and the central cavity presenting an opening in the base curve; sizing and shaping the central cavity to have a posterior facing tear shaping surface structured to form the tear lens within the central cavity; and selecting the central cavity to have a cavity peripheral edge having a diameter of between two millimeters and five millimeters located on a center or centroid of the cavity that is located collinear with an optical center of the curved lens body; and selecting the central cavity to have a depth between twenty five microns and one hundred microns as measured from a center of the tear shaping surface and to an imaginary extension of the base curve of the curved lens body.

11. The method of correcting refractive error as claimed in claim 10, further comprising defining in the curved lens body at least one passage therethrough that creates a fluid connection between the central cavity and an anterior surface of the lens.

12. The method of correcting refractive error as claimed in claim 11, further comprising structuring the at least one passage to comprise a central passage.

13. The method of correcting refractive error as claimed in claim 11, further comprising structuring the at least one passage to comprise at least one peripheral passage.

14. The method of correcting refractive error as claimed in claim 11, further comprising structuring the at least one passage to comprise at least one central passage and at least one peripheral passage.

15. The method of correcting refractive error as claimed in claim 10, further comprising structuring the peripheral cavity edge such that opposing portions of the cavity peripheral edge, when viewed in cross section, are parallel.

16. The method of correcting refractive error as claimed in claim 10, further comprising structuring the peripheral cavity edge such that opposing portions of the cavity peripheral edge, when viewed in cross section, are non-parallel.

17. The method of correcting refractive error as claimed in claim 10, further comprising structuring the posterior facing tear shaping surface to have a first radius of curvature longer than a second radius of curvature of an anterior corneal surface in which the lens is to be placed in close approximation.

18. The method of correcting refractive error as claimed in claim 10, further comprising structuring the posterior facing tear shaping surface to have a first radius of curvature shorter than a second radius of curvature of an anterior corneal surface in which the lens is to be placed in close approximation.

\* \* \* \* \*